United States Patent
Wünsch et al.

(10) Patent No.: US 6,281,304 B1
(45) Date of Patent: *Aug. 28, 2001

(54) PREPARATION OF POLYMERS OF VINYLAROMATIC COMPOUNDS UNDER SUPERATMOSPHERIC PRESSURE IN THE PRESENCE OF VOLATILE HYDROCARBONS

(75) Inventors: Josef Wünsch, Schifferstadt; David Fischer, Gönnheim, both of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/894,943

(22) PCT Filed: Mar. 6, 1996

(86) PCT No.: PCT/EP96/00939

§ 371 Date: Sep. 4, 1997

§ 102(e) Date: Sep. 4, 1997

(87) PCT Pub. No.: WO96/29353

PCT Pub. Date: Sep. 26, 1996

(30) Foreign Application Priority Data

Mar. 17, 1995 (DE) .............................................. 195 09 785

(51) Int. Cl.$^7$ .............................. C08F 12/08; C08F 4/64; C08F 12/04
(52) U.S. Cl. .......................... 526/131; 526/133; 526/134; 526/159; 526/160; 526/169; 526/170; 526/183; 526/346
(58) Field of Search ..................................... 526/943, 133, 526/131, 346, 159, 160, 183

(56) References Cited

U.S. PATENT DOCUMENTS 5,308,811 * 5/1994 Suga ........................................ 502/62
5,693,730 * 12/1997 Kuber .................................... 526/127

FOREIGN PATENT DOCUMENTS 312 976    4/1989 (EP) .
0 584 646 * 3/1994 (EP) .

* cited by examiner

*Primary Examiner*—Fred Zitomer
(74) *Attorney, Agent, or Firm*—Keil & Weinakuf

(57) ABSTRACT

In a process for preparing polymers of vinylaromatic compounds at from 0 to 150° C. in the presence of metallocene complexes as catalysts, the polymerization is carried out at a pressure of from 5 to 300 bar in the presence of aliphatic $C_1$–$C_4$-hydrocarbons using a coordination complex selected from the group consisting of strong, uncharged Lewis acids, ionic compounds having Lewis acid cations and ionic compounds having Bronsted acids as cations as cocatalyst.

26 Claims, No Drawings

PREPARATION OF POLYMERS OF VINYLAROMATIC COMPOUNDS UNDER SUPERATMOSPHERIC PRESSURE IN THE PRESENCE OF VOLATILE HYDROCARBONS

The present invention relates to a process for preparing polymers of vinylaromatic compounds at from 0 to 150° C. in the presence of metal-locene complexes as catalysts.

The present invention further relates to the use of the polymers obtainable in this way for producing moldings.

Owing to their property profile, polymers of vinylaromatic compounds, in particular polystyrenes, are used in many fields, for example as packaging materials or as insulating coatings for plastics, specifically in electrical applications.

EP-A 312 976 discloses the polymerization of vinylaromatic compounds, specifically of styrene or substituted styrenes, in the presence of metallocene complexes as catalysts in an aromatic solvent. This leads to the solvent having to be removed at high temperatures in the work-up of the polymers.

It is an object of the present invention to provide novel processes for preparing polymers of vinylaromatic compounds which are less complicated in process terms and, in particular, make the energy-intensive removal of the solvent superfluous.

We have found that this object is achieved by a process for preparing polymers of vinylaromatic compounds at from 0 to 150° C. in the presence of metallocene complexes as catalysts, wherein the polymerization is carried out at a pressure of from 5 to 300 bar in the presence of aliphatic $C_1$–$C_4$-hydrocarbons using a coordination complex selected from the group consisting of strong, uncharged Lewis acids, ionic compounds having Lewis acid cations and ionic compounds having Brönsted acid cations as cocatalyst.

Furthermore, the present invention provides for the use of the polymers obtainable in this way for producing moldings.

Suitable vinylaromatic compounds are, in particular, compounds of the formula I

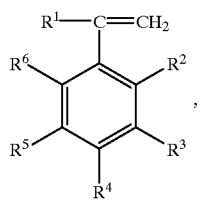

(I)

where the substituents have the following meanings:
$R^1$ is hydrogen or $C_1$–$C_4$-alkyl,
$R^2$ to $R^6$ are, independently of one another, hydrogen, $C_1$–$C_{12}$-alkyl, $C_6$–$C_{18}$-aryl, halogen or two adjacent radicals together form a cyclic group having from 4 to 15 carbon atoms.

Preference is given to using vinylaromatic compounds of the formula I in which
$R^1$ is hydrogen and $R^2$ to $R^6$ are hydrogen, $C_1$–$C_4$-alkyl, chlorine or phenyl or two adjacent radicals together form a cyclic group having from 4 to 12 carbon atoms so that the compounds of the formula I are, for example, naphthalene derivatives or anthracene derivatives.

Examples of such preferred compounds are: styrene, p-methylstyrene, p-chlorostyrene, 2,4-dimethylstyrene, 4-vinylbiphenyl, 2-vinylnaphthalene or 9-vinylanthracene.

It is also possible to use mixtures of different vinylaromatic compounds, but preference is given to using only one vinylaromatic compound.

Particularly preferred vinylaromatic compounds are styrene and p-methylstyrene.

The preparation of vinylaromatic compounds of the formula I is known per se and is described, for example, in Beilstein 5, 367, 474, 485.

In the process of the present invention, metallocene complexes used are preferably those of the formula II

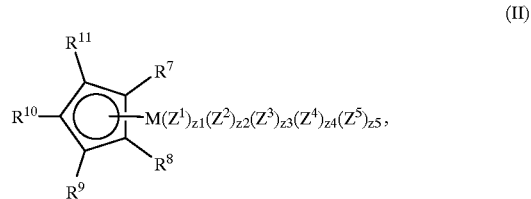

(II)

where the substituents and indices have the following meanings:
$R^7$ to $R^{11}$ are hydrogen, $C_1$–$C_{10}$-alkyl, 5- to 7-membered cycloalkyl which in turn may bear $C_1$–$C_6$-alkyl groups as substituents, $C_6$–$C_{15}$-aryl or aralkyl or two adjacent radicals may also together form a cyclic group having from 4 to 15 carbon atoms, or $Si(R^{12})_3$,
where $R^{12}$ is $C_1$–$C_{10}$-alkyl, $C_6$–$C_{15}$-aryl or $C_3$–$C_{10}$-cycloalkyl,
M is a metal of transition groups III to VI of the Periodic Table of the Elements or a lanthanide metal,
$Z^1$ to $Z^5$ are hydrogen, halogen, $C_1$–$C_{10}$-alkyl, $C_6$–$C_{15}$-aryl, $C_1$–$C_{10}$-alkoxy or $C_1$–$C_{15}$-aryloxy and
$z_1$ to $z_5$ are 0, 1, 2, 3, 4 or 5, where the sum $z_1+z_2+z_3+z_4+z_5$ corresponds to the valence of M minus 1.

Particularly preferred metallocene complexes of the formula II are those in which
M is a metal of transition group IV of the Periodic Table of the Elements, in particular titanium, and
$Z^1$ to $Z^5$ are $C_1$–$C_{10}$-alkyl, $C_1$–$C_{10}$-alkoxy or halogen.

Examples of such preferred metallocene complexes are: pentamethylcyclopentadienyltitanium trichloride, pentamethylcyclopentadienyltrimethyltitanium and pentamethylcyclopentadienyltitanium trimethoxide.

It is also possible to use metallocene complexes as described in EP-A 584 646.

Mixtures of various metallocene complexes can also be used.

Such complexes can be synthesized by methods known per se, with preference being given to reacting the corresponding substituted, cyclic hydrocarbon anions with halides of titanium, zirconium, hafnium, vanadium, niobium or tantalum.

Examples of appropriate preparative methods are described, inter alia, in Journal of Organometallic Chemistry, 369 (1989), 359–370.

In the process of the present invention, the polymerization is carried out at a pressure of from 5 to 300 bar, preferably from 6 to 100 bar, in particular from 7 to 50 bar, in the presence of aliphatic $C_1$–$C_4$-hydrocarbons. Preference is given to linear or branched aliphatic $C_3$–$C_4$-hydrocarbons, in particular propane and isobutane. Mixtures of various aliphatic $C_1$–$C_4$-hydrocarbons can likewise be used.

As cocatalyst, use is made of a coordination complex selected from the group consisting of strong, uncharged Lewis acids, ionic compounds having Lewis acid cations and ionic compounds having Brönsted acid cations.

As strong, uncharged Lewis acids, preference is given to compounds of the formula III $$M^1X^1X^2X^3 \quad \text{(III)}$$

where $M^1$ is an element of main group III of the Periodic Table, in particular B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular haloaryls, preferably pentafluorophenyl.

Particular preference is given to compounds of the formula III in which $X^1$, $X^2$ and $X^3$ are identical, preferably tris(pentafluorophenyl)borane. These compounds and methods for preparing them are known per se and described, for example, in WO 93/3067.

Suitable ionic compounds having Lewis acid cations are compounds of the formula IV $$[(A^{a+})Q_1Q_2\ldots Q_z]^{d+} \quad \text{(IV)}$$

where

A is an element of main groups I to VI or transition groups I to VIII of the Periodic Table, $Q_1$ to $Q_z$ are radicals bearing a single negative charge, for example $C_1$–$C_{28}$-alkyl, $C_6$–$C_{15}$-aryl, alkylaryl, arylalkyl, haloalkyl, haloaryl each having from 6 to 20 carbon atoms in the aryl radical and from 1 to 28 carbon atoms in the alkyl radical, $C_1$–$C_{10}$-cycloalkyl which may bear $C_1$–$C_{10}$-alkyl groups as substituents, halogen, $C_1$–$C_{28}$-alkoxy, $C_6$–$C_{15}$-aryloxy, silyl or mercaptyl groups, a is an integer from 1 to 6, z is an integer from 0 to 5, d corresponds to the difference a–z, but d is greater than or equal to 1.

Particularly suitable cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have non-coordinating counter-ions, in particular boron compounds as are also mentioned in WO 91/09882, preferably tetrakis(pentafluorophenyl)borate.

Ionic compounds having Brönsted acids as cations and preferably likewise non-coordinating counter-ions are mentioned in WO 93/3067; the preferred cation is N,N-dimethylanilinium.

The metallocene complexes can be used in unsupported form, but they are preferably used in supported form.

Suitable support materials are, for example, silica gels, preferably those of the formula $SiO_2 \cdot bAl_2O_3$, where b is from 0 to 2, preferably from 0 to 0.5; these are thus essentially aluminosilicates or silicon dioxide. The supports preferably have a particle diameter range from 1 to 200 μm, in particular from 30 to 80 μm. Such products are commercially available, e.g. as silica gel 332 from Grace.

Further supports are, inter alia, finely divided polyolefins, for example finely divided polypropylene or polyethylene, or else polyethylene glycol, polybutylene terephthalate, polyethylene terephthalate, polyvinyl alcohol, polystyrene, polybutadiene, polycarbonates or their copolymers.

In addition, aluminum alkyls can also be used in the polymerization. Particularly suitable aluminum alkyls are trimethylaluminum, triethylaluminum, triisopropylaluminum, tri-n-propylaluminum, triisobutylaluminum and tri-n-butylaluminum, but in particular triisobutylaluminum.

It has been found to be advantageous for the molar ratio of the vinylaromatic compound to the cocatalyst to be in the range from $10^2:1$ to $10^7:1$, preferably from $10^3:1$ to $10^6:1$. The molar ratio of cocatalyst to the metallocene complex is preferably in the range from $10^2:1$ to $10^7:1$, in particular from $10^2:1$ to $10^5:1$.

The molar ratio of the vinylaromatic compound to the aliphatic $C_1$–$C_4$-hydrocarbons is preferably in the range from 5:1 to $10^4:1$, in particular from 10:1 to $10^3:1$.

If an aluminum alkyl is used, a molar ratio of aluminum alkyl to the metallocene complex of from 10,000:1 to 10:1, preferably from 1000:1 to 100:1, has been found to be particularly useful.

Suitable polymerization temperatures are in the range from 0 to 150° C. preferably from 10 to 100° C. and polymerization times can be in the range from 0.1 to 24 hours, preferably from 0.5 to 6 hours.

In the process of the present invention, the preferred procedure is to add $SiO_2$ support modified with trimethylaluminum to the metallocene complex, preferably in a solvent such as toluene. In the actual polymerization, the vinylaromatic compound is preferably initially charged together with the aliphatic $C_1$–$C_4$-hydrocarbon. The supported catalyst is then introduced at a pressure of from 5 to 300 bar while injecting the aliphatic $C_1$–$C_4$-hydrocarbon. At from 0 to 150° C., the polymerization is started after a period of preferably from 0.2 to 120 minutes by addition of the cocatalyst and the mixture is then allowed to polymerize for from 0.1 to 24 hours. The temperature is then lowered and the reactor is depressurized to a pressure of about 1 bar. The resulting polymer is separated off, washed and dried.

The process of the present invention is relatively uncomplicated technically; the polymers formed are syndiotactic and are particularly suitable for use in molding compositions in electrical or high-temperature applications. The molar masses of the polymers prepared by the process of the present invention are in the range from 10,000 to 10 million g/mol, preferably from 50,000 to 1 million g/mol.

EXAMPLES

Preparation of syndiotactic polystyrene

Example 1

Application of the catalyst to a support

In a dry reactor flushed with argon, 4.0 kg of $SiO_2$ (Grace, SG 332-50 μm, 5% by weight of $H_2O$) were suspended in 30 l of heptane and thermostatted to 180° C. 16.81 mmol of pentamethylcyclopentadienyltrimethyltitanium dissolved in 4.92 l of toluene were added dropwise to this suspension over a period of 60 minutes, with the temperature not exceeding 30° C. After addition was complete, the mixture was stirred further for 60 minutes. The solvent was then removed at 50° C. under reduced pressure, giving a yellow free-flowing powder.

Example 2

Polymerization of styrene

A 1 l autoclave which had been made inert with nitrogen was charged with 0.6 mol of styrene (62.5 g) in 400 ml of isobutane. 1.1225 g (5×10⁻⁵ molar in pentamethylcyclopentadienyltrimethyltitanium) of the catalyst from Example 1 were introduced into the autoclave while injecting the isobutane to a pressure of 10 bar. In addition, 0.793 g (4×10⁻³ mol) of triisobutylaluminum were introduced into the autoclave. The internal temperature was regulated at 50° C. and the polymerization was started after a defined time t by addition of 25.6 mg (5×10⁻⁵ mol) of $B(C_6F_5)_3$. After a polymerization time of 2 hours, the internal temperature was lowered to 25° C. and the autoclave was depressurized to atmospheric pressure. The resulting polymer was washed with methanol and dried at 50° C. under reduced pressure. The molecular weight was determined by GPC (gel permeation Chromatography) in 1,3,5-trichlorobenzene as solvent at 120° C. The proportion of syndiotactic material was determined by $^{13}$C-NMR.

| | t [min] | Molecular weight $M_w$ (weight average) | Polydispersity $M_w/M_n$ | Proportion of syndiotactic material |
|---|---|---|---|---|
| Example 2a | 5 | 380 200 | 1.8 | >96% |
| Example 2b | 30 | 254 900 | 2.1 | >96% |
| Example 2c | 60 | 271 800 | 2.2 | >96% |

We claim:

1. A process for preparing a polymer of vinylaromatic compounds at from 0 to 150° C. in the presence of a metallocene complex as catalyst, wherein the metallocene catalyst is a metallocene complex of formula II

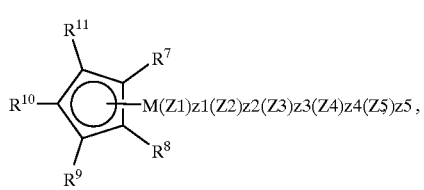

(II)

wherein
R⁷ to R¹¹ are hydrogen, $C_1-C_{10}$-alkyl, 5- to 7-membered cycloalkyl which in turn may bear $C_1-C_6$-alkyl groups as substituents, $C_6-C_{15}$-aryl or aralkyl or two adjacent radicals may also together form a cyclic group having from 4 to 15 carbon atoms, or Si $(R^{12})_3$, where $R^{12}$ is $C_1-C_{10}$-alkyl, $C_6-C_{15}$-aryl or $C_3-C_{10}$-cycloalkyl, M is a metal of transition groups III to VI of the Periodic Table of the Elements or a lanthanide metal, Z¹ to Z⁵ are hydrogen, halogen, $C_1-C_{10}$-alkyl, $C_6-C_{15}$-aryl, $C_1-C_{10}$-alkoxy or $C_1-C_{50}$-aryloxy, and $z_1$ to $z_5$ are 0, 1, 2, 3, 4 or 5, where the SUM $z_1+z_2+z_3+z_4+z_5$ corresponds to the valence of M minus 1, which is in a supported form, the support being selected from the group consisting of silica gels, finely divided polyolefins, polyethylene glycol, polybutylene terephthalate, polyethylene terephthalate, polyvinyl alcohol, polystyrene, polybutadiene, polycarbonates and copolymers thereof, and the polymerization is carried out at a pressure of from 5 to 300 bar in the presence of an aliphatic $C_1-C_4$-hydrocarbon and, as cocatalyst, a coordination complex selected from the group consisting of i) a strong uncharged Lewis acid of the formula III $M^1X^1X^2X^3$ (III)

wherein
M¹ is an element of main group III of the Periodic Table, and
X¹, X² and X³ are hydrogen, $C_1-C_{10}$-alkyl, $C_6-C_{15}$-aryl, alkylaryl, arylalkyl, haloalkyl, or haloaryl each having from 1 to 10 carbon atoms in the alkyl radical and from 6 to 20 carbon atoms in the aryl radical, or fluorine, chlorine, bromine or iodine, and ii) an ionic compound having a Lewis acid cation of the formula IV $[(A^{a-})Q_1Q_2\ldots Q_z]^{d-}$ (IV)

wherein
A is an element of main groups I to VI or transition groups I to VIII of the Periodic Table,
$Q_1$ to $Q_z$ are radicals bearing a single negative charge selected from the group consisting of $C_1-C_{28}$-alkyl, $C_6-C_{15}$-aryl, $C_1-C_{28}$-alkyl-$C_6-C_{20}$-aryl, $C_6-C_{20}$-aryl-$C_1-C_{28}$-alkyl, $C_1-C_{28}$-haloalkyl, $C_6-C_{20}$-haloaryl, halogen, $C_1-C_{28}$-alkoxy, $C_6-C_{15}$-aryloxy, silyl, rnercaptyl, $C_1-C_{10}$-cy-$C_1-C_{10}$-cycloalkyl and $C_1-C_{10}$-cycloalkyl which is substituted by $C_1-C_{10}$-alkyl,
a is an integer from 1 to 6,
z is an integer from 0 to 5, and
d corresponds to the difference a−z, but d is greater than or equal to 1 with the proviso that the metallocene complex cannot be $Ag[B(C_6H_5)4]$.

2. The process of claim 1, wherein the vinylaromatic compound is a compound of the formula I.

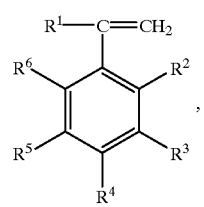

(I)

where the substituents have the following meanings:
R¹ is hydrogen or $C_1-C_4$-alkyl,
R² to R⁶ are, independently of one another, hydrogen, $C_1-C_{12}$-alkyl, $C_6-C_{18}$-aryl, halogen or two adjacent radicals together form a cyclic group having from 4 to 15 carbon atoms.

3. The process of claim 2, wherein
R¹ is hydrogen, and
R² to R⁶ are hydrogen, $C_1-C_4$-alkyl, chlorine, phenyl or two adjacent radicals together form a cyclic group having from 4 to 12 carbon atoms.

4. The process of claim 2, wherein the polymerization is carried out in the presence of a linear or branched aliphatic $C_3-C_4$-hydrocarbon.

5. The process of claim 3, wherein the aliphatic hydrocarbon is propane or isobutane.

6. The process of claim 2, which is carried out in the presence of an aluminum alkyl.

7. The process of claim 2, wherein the molar ratio of the vinylaromatic compound to the cocatalyst is from $10^2$:1 to $10^7$:1.

8. The process of claim 2, wherein the molar ratio of the vinylaromatic compound to the aliphatic hydrocarbon is from 5:1 to $10^4$:1.

9. The process of claim 5, wherein the molar ratio of the aluminum alkyl to the metallocene complex is from 10,000:1 to 10:1.

10. The process of claim 1, wherein
M is a metal of transition group IV of the Periodic Table of the Elements.

11. The process of claim 10, wherein M is titanium, and $Z^1$ to $Z^5$ are $C_1$–$C_{10}$-alkyl, $C_1$–$C_{10}$-alkoxy or halogen.

12. The process of claim 1, wherein wherein the metallocene complex is selected from the group consisting of pentamethylcyclopentadienyltitanium trichloride, pentamethylcyclopentadienyltrimethyltitanium and pentamethylcyclopentadienyltitanium trimethoxide.

13. The process of claim 1, wherein the cocatalyst is the strong uncharged Lewis acid of the formula III.

14. The process of claim 1, wherein $M^1$ is B, Al or Ga.

15. The process of claim 1, wherein $M^1$ is B.

16. The process of claim 1, wherein $X^1$, $X^2$ and $X^3$ are haloaryl radicals.

17. The process of claim 1, wherein $X^1$, $X^2$ and $X^3$ are pentafluorophenyl.

18. The process of claim 11, wherein the cocatalyst is the ionic compound having a Lewis acid cation of the formula IV.

19. The process of claim 1, wherein the cocatalyst is selected from the group consisting of carbonium cations, oxonium cations, sulfonium cations and cationic transition metal complexes.

20. The process of claim 1, wherein the cocatalyst is selected from the group consisting of the triphenylmethyl cation, the silver cation and the 1,1'-dimethylferrocenyl cation.

21. The process of claim 1, wherein the cocatalyst is an ionic compound having the Brönsted acid N,N-dimethylanilinium as the cation.

22. The process of claim 1, wherein the support of the catalyst is a silica gel of the formula $SiO_2 \cdot bAl_2O_3$, where b is from 0 to 2.

23. The process of claim 22, wherein b is from 0 to 0.5.

24. The process of claim 1, wherein the support has particles of a particle diameter of from 1 to 200 μm.

25. The process of claim 24, wherein the particle diameter is from 30 to 80 μm.

26. The process of claim 24, wherein the polymerization is carried out at a pressure of at least 10 bar.

* * * * *

UNITED STATES PATENT AND TRADEMARK OFFICE
CERTIFICATE OF CORRECTION

PATENT NO. : 6,281,304 B1
DATED : August 28, 2001
INVENTOR(S) : Wuensch et al.

Page 1 of 1

It is certified that error appears in the above-identified patent and that said Letters Patent is hereby corrected as shown below:

Column 5, claim 1,
Line 47, "i s" should be -- is --.

Column 6, claim 4,
Line 55, "2" should be -- 1 --.

Column 6, claim 5,
Line 58, "3" should be -- 1 --.

Column 6, claim 6,
Line 60, "2" should be -- 1 --.

Column 6, claim 7,
Line 62, "2" should be -- 1 --.

Column 6, claim 8,
Line 65, "2" should be -- 1 --.

Column 7, claim 12,
Line 9, delete "wherein", double occurrence.

Column 7, claim 18,
Line 22, "11" should be -- 1 --.

Signed and Sealed this

Ninth Day of April, 2002

Attest:

Attesting Officer

JAMES E. ROGAN
Director of the United States Patent and Trademark Office